United States Patent
Akgun et al.

[11] Patent Number: 5,163,809
[45] Date of Patent: Nov. 17, 1992

[54] SPIRAL WOUND CONTAINMENT RING

[75] Inventors: Yusuf V. Akgun, Ville St. Laurent; Eugene Gekht, Montreal, both of Canada

[73] Assignee: Pratt & Whitney Canada, Inc., Longueuil, Canada

[21] Appl. No.: 692,874

[22] Filed: Apr. 29, 1991

[51] Int. Cl.[5] ............................................. F01D 21/00
[52] U.S. Cl. ........................................ 415/9; 415/196; 415/200; 29/523
[58] Field of Search ................... 415/9, 200, 189, 196; 29/446, 451, 523

[56] References Cited

U.S. PATENT DOCUMENTS

| | | | |
|---|---|---|---|
| 1,698,514 | 1/1929 | Schmidt | 74/609 |
| 2,372,723 | 4/1945 | Jasper | 29/446 |
| 3,203,180 | 8/1965 | Price | |
| 3,602,602 | 8/1971 | Motta | 74/608 |
| 3,887,976 | 6/1975 | Sheilds et al. | 29/446 |
| 4,418,560 | 12/1983 | Pechacek | 29/446 |
| 4,699,567 | 10/1987 | Stewart | 415/200 |
| 4,818,176 | 4/1989 | Hoether et al. | 415/9 |
| 4,902,201 | 2/1990 | Neubert | 415/197 |

FOREIGN PATENT DOCUMENTS 1245415 8/1971 United Kingdom .
2037900 7/1980 United Kingdom .

Primary Examiner—Edward K. Look
Assistant Examiner—Michael S. Lee
Attorney, Agent, or Firm—Troxell K. Snyder

[57] ABSTRACT

A spiral wound containment ring (b 201 ) is received within a radially inward facing channel (38) in an engine case (18).

6 Claims, 2 Drawing Sheets

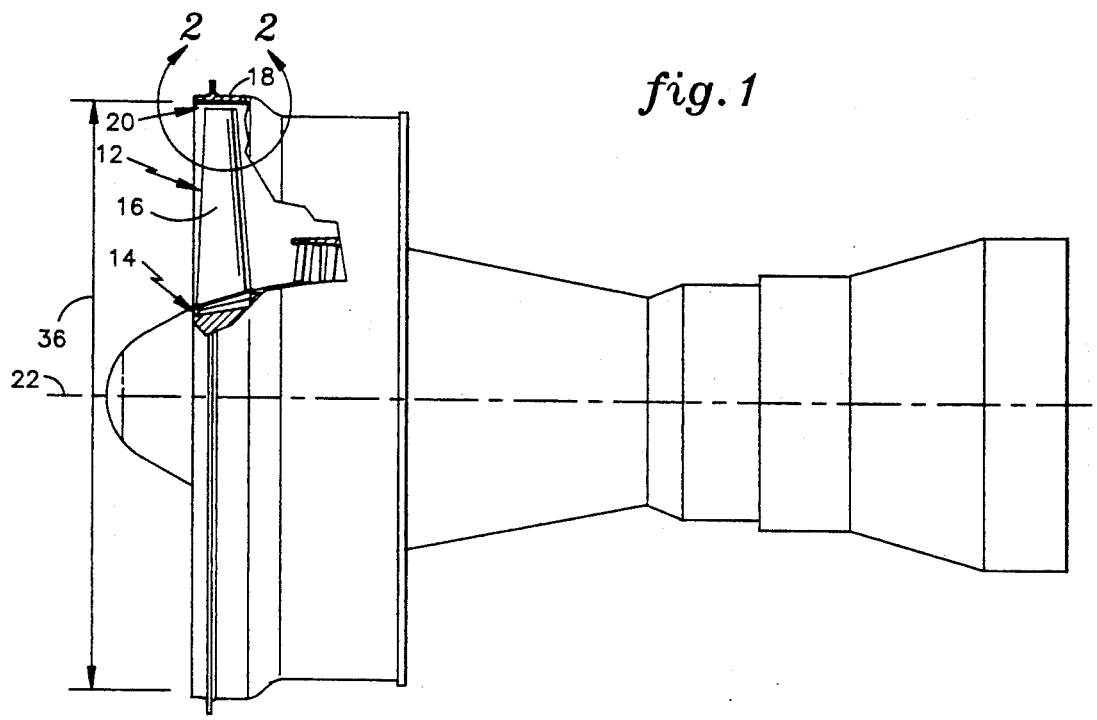
fig. 1
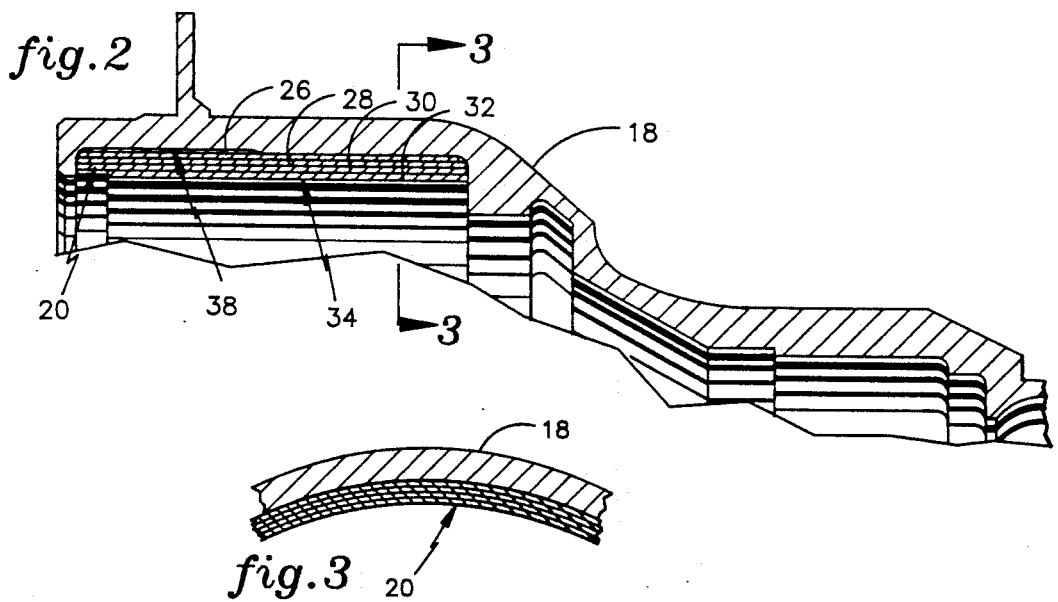
fig. 2
fig. 3
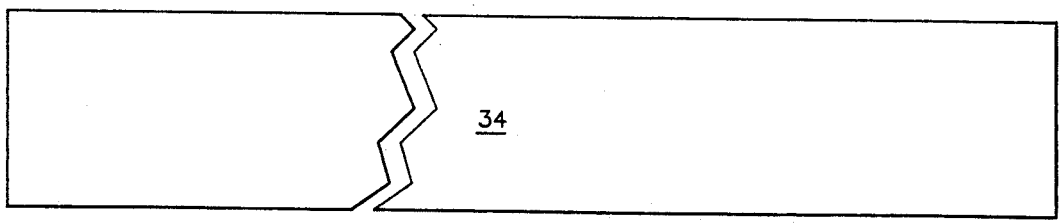
fig. 4

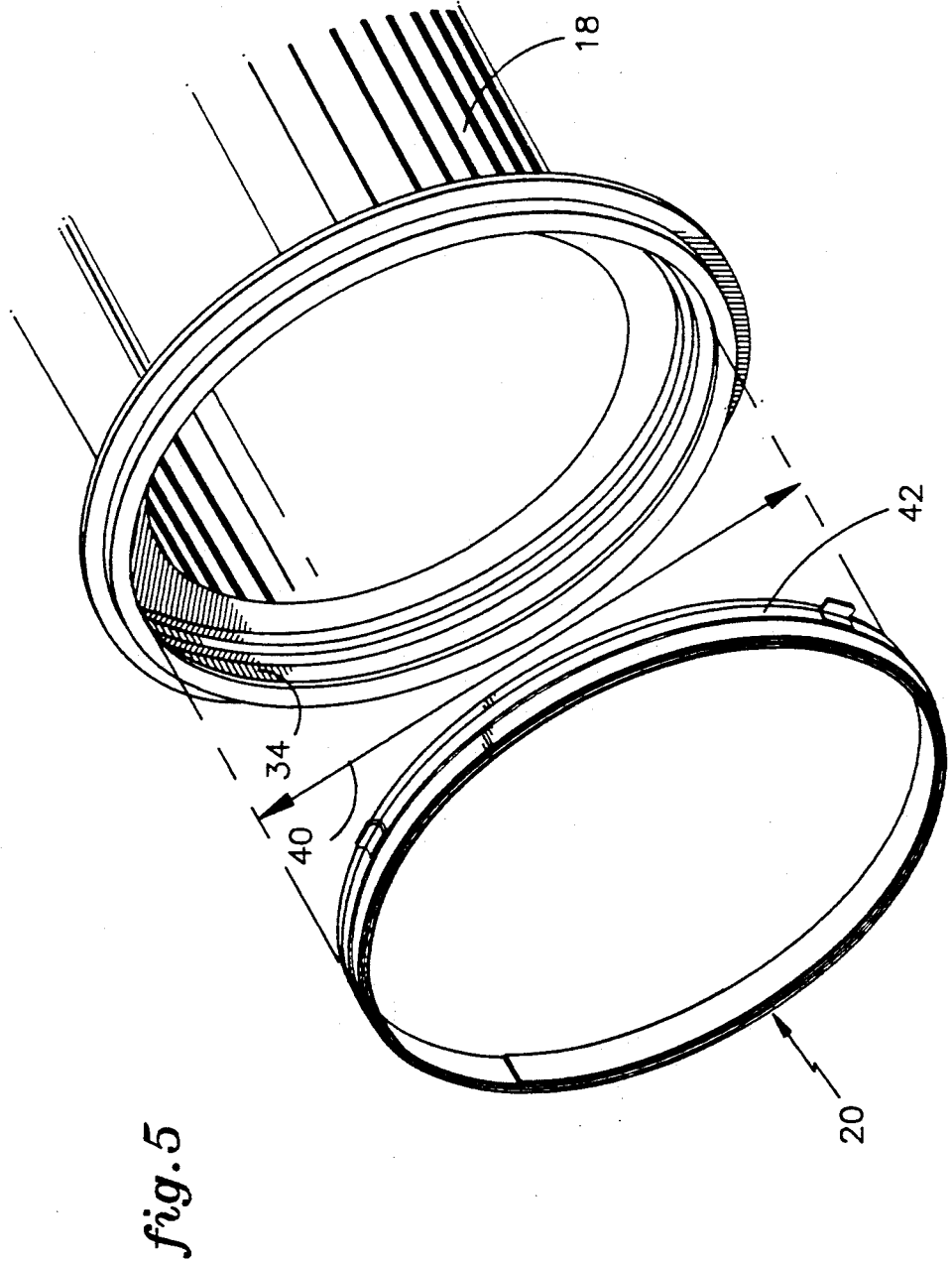

SPIRAL WOUND CONTAINMENT RING

FIELD OF THE INVENTION

The present invention relates to a containment ring for a rotor.

BACKGROUND

High speed rotors, particularly those in gas turbine engines or the like, are occasionally subject to failure in which a portion of the spinning rotor becomes separated and continues tangentially from the point of separation in a generally radially outward direction. For aircraft applications, the separated portions, typically a rotor blade, must be restrained or deflected by the surrounding engine case in order to prevent the separated member from causing further damage by striking remaining engine parts or the aircraft itself.

Typical installations use an annular containment structure located in the plane of the rotor and secured to the engine case or housing. The containment ring may be fabricated of metallic or composite materials and serves to strengthen the engine case, at least locally, in order to prevent any separated members from passing through the engine case and beyond.

Gas turbine engine designers attempt to provide a containment ring or structure having sufficient strength to absorb the energy of a detached blade with the desire to keep engine weight as low as practical.

It will further be appreciated by those skilled in the art that such containment rings, after having absorbed or deflected a detached blade, may require replacement or refurbishment. It is therefore desirable to have a containment ring which is easily removed or installed and which attaches to the engine case with a minimum of hardware and labor.

SUMMARY OF THE INVENTION

The present invention provides a containment ring for preventing radially outwardly moving debris from a failed or broken rotor from escaping the surrounding engine case. The containment ring of the present invention absorbs the energy of the debris in a plurality of radially overlapping layers formed by winding an elongated metallic strip into a spiral form concentric with the rotor.

The wound strip further has the feature of having an unrestrained outer diameter greater than its installed diameter within the surrounding engine case, thereby resulting in a continual radial compression force between the case and ring. This compression force retains the ring within the engine case without fasteners or welds, thus allowing the ring to be installed or replaced easily. The present invention further provides a method for installing the spiral wound containment ring, wherein the ring is first compressed within a retaining hoop at a diameter less than the installed diameter. The hoop and ring are then located adjacent to the engine case and the ring released from the hoop and allowed to expand into its installed position within the case.

BRIEF DESCRIPTION OF THE DRAWINGS

FIG. 1 shows a cross-section of a gas turbine engine having a fan rotor stage with a containment ring according to the present invention.

FIG. 2 shows a detailed cross-section of the containment ring as installed in the engine case.

FIG. 3 shows a cross-section in the radial plane of the containment ring.

FIG. 4 shows the elongated strip of the present invention before being wound into a containment ring.

FIG. 5 illustrates the method of installing the containment ring of the present invention.

DETAILED DESCRIPTION

Referring to the drawing figures, and particularly to FIG. 1, a partial sectional view of an axial flow gas turbine engine 10 is shown. A rotor assembly 12 is shown including a central hub portion 14 and a plurality of individual blades 16 extending radially outward therefrom. An engine case 18 is shown surrounding the entire rotor assembly 12 and forms the supporting structure of the engine. In the event of a catastrophic failure of a blade 16 or any other component rotor assembly 12 from exiting the case 18 following a catastrophic failure, the present invention provides a containment ring 20 which is disposed in the case 18 in the plane of the rotor assembly 12 and is located concentrically about the axis of rotation 22.

FIG. 2 shows a more detailed cross-section of the containment ring 20. Containment ring 20 is formed of a plurality of individual passes 26, 28 30, 32 of a single elongated metallic band 34. The elongated band 34, shown also in FIG. 4 in its fully extended form, is wrapped in a spiral fashion to form the annular containment ring 20.

Band 34 consists of a resilient composite material or a metal, such as Inco X-750 or Inco 600 and, although wound spirally for installation within the engine case 18, continues to exert a strong radially outward force against the case 18 as the band 34 attempts to return to its original linear configuration.

The spiral wound containment ring 20 according to the present invention thus has an outer diameter, when it is unrestrained, which is greater than the diameter 36 as installed within the case 18.

FIG. 3 shows a circumferential cross-section as indicated in FIG. 2 of the containment ring 20 and case 18.

The containment ring 20 according to the present invention is located within the case 18 by means of a radially inward facing channel 38 which receives the ring 20 and restrains it against axially forward or aft movement relative to the remainder of the case 18. The expansive force exerted by the ring 20 against the channel portion 38 of the case 18 serves to hold the ring 20 firmly in place without the use of welding or mechanical fasteners, thereby avoiding local thermal stress and/or stress concentrating holes in the case 18 or ring 20.

It is further the feature of the present invention that the constant expansive force exerted between the individual passes 26, 28, 30, 32 of the band 34 reduce or avoid the occurrence of fretting or rubbing wear between adjacent layers as might be induced by vibration of the engine 10 during operation. In the event of a failure of the rotor assembly 12 in which a blade fragment or other debris impacts the containment ring 20 at high radially outward velocity, the constant expansive force exerted by each pass 26, 28, 30, 32 of the band 34 increases the frictional resistive force between adjacent passes and assists the entire ring 20 in absorbing the energy of the impacting debris.

Spin pit testing of containment rings 20 has indicated that winding the spiral outward in the same direction as its rotor spins increases the containing ability of the installed ring 20.

By avoiding the unitary annular structure of some prior art containment rings, the spiral wound containment ring 20 according to the present invention reduces the likelihood of a second catastrophic failure due to hoopwise overstressing of the containment ring. The multiple passes 26-32 of the ring 20 according to the present invention will experience relative circumferential sliding motion in the invention of a debris impact thus allowing the ring to expand somewhat locally without risk of separation of failure.

Another feature achieved by the avoidance of the use of fasteners for welding is the ease of installation or changeout of the spiral containment ring 20. Installation is effected, either in the factory or in the field, by initially winding the band 34 into a spiral ring having an outer diameter 40 less than the installed diameter 36. The ring 20 may be retained in this reduced diameter condition by means of a restraining hoop 42 as shown in FIG. 5. During installation, the hoop 42 and ring 20 are positioned adjacent the receiving channel 34 in the case 18 whereupon the restraining hoop 42 is released to allow the ring to expand radially into the channel 34. The containment ring 20 may be released from the restraining hoop 42 in a variety of ways, for example, cutting of the hoop 42 or, alternatively, by simply pushing the ring axially relative to the hoop 42 until it is released therefrom.

Removal of the installed ring may be accomplished by grasping its radially inner, free end of the hand 34 and winding it inward, thus "rolling up" the spiral.

We claim:

1. An outer containment ring for a rotor disposed within a concentric housing, comprising:
    an elongated resiliant strip, said strip being wound in a spiral to form a plurality of radial layers and being restrained radially within the housing, said strip further having an unrestrained outer diameter greater than the restrained diameter thereof.

2. The ring as recited in claim 1, wherein the strip is received within a radially inward facing channel disposed circumferentially within the casing.

3. The ring as recited in claim 2, wherein the strip is retained within the channel solely by a radial expansion force exerted by the strip on the case.

4. The ring as recited in claim 1, wherein the radially inward to outward circumferential winding direction of the spiral is the same as the direction of rotation of the rotor.

5. The ring as recited in claim 1, wherein the strip is fabricated of Inco-600.

6. A method of installing a spiral wound containment ring in an engine casing, said ring having an unrestrained outer diameter greater than the installed diameter of the ring, comprising the steps of:
    a. compressing the ring within an annular restraining hoop, the inner diameter of the restraining hoop being no greater than the installed diameter of the ring;
    b. locating the hoop and compressed ring adjacent the engine case; and
    c. releasing the ring from the radial restraint of the hoop and allowing the ring to expand into radial contact with the case.

* * * * *